US009223589B2

(12) United States Patent
Young

(10) Patent No.: US 9,223,589 B2
(45) Date of Patent: Dec. 29, 2015

(54) SMOOTH LAYOUT ANIMATION OF VISUALS

(75) Inventor: Kenneth L. Young, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 688 days.

(21) Appl. No.: 12/713,173

(22) Filed: Feb. 26, 2010

(65) Prior Publication Data

US 2011/0214079 A1    Sep. 1, 2011

(51) Int. Cl.
*G06F 9/44* (2006.01)

(52) U.S. Cl.
CPC ................... *G06F 9/4443* (2013.01)

(58) Field of Classification Search
CPC ............. G06F 9/45504; G06F 9/4443
USPC ........................................ 715/765, 530
See application file for complete search history.

(56) References Cited

U.S. PATENT DOCUMENTS

| | | | | |
|---|---|---|---|---|
| 7,216,298 | B1* | 5/2007 | Ballard et al. | 715/760 |
| 7,262,775 | B2 | 8/2007 | Calkins et al. | |
| 2003/0028561 | A1 | 2/2003 | Gounares et al. | |
| 2004/0003348 | A1* | 1/2004 | Ostertag et al. | 715/514 |
| 2004/0064808 | A1* | 4/2004 | Kira | 717/154 |
| 2005/0046630 | A1* | 3/2005 | Jacob et al. | 345/475 |
| 2005/0086238 | A1 | 4/2005 | Nevin, III | |
| 2006/0129921 | A1* | 6/2006 | Relyea et al. | 715/524 |
| 2006/0232589 | A1* | 10/2006 | Glein | 345/473 |
| 2007/0055932 | A1* | 3/2007 | Glein et al. | 715/526 |
| 2008/0162207 | A1* | 7/2008 | Gross et al. | 705/7 |
| 2008/0303826 | A1 | 12/2008 | Schiff | |
| 2009/0150813 | A1 | 6/2009 | Chang et al. | |
| 2009/0164946 | A1 | 6/2009 | Liddington | |

(Continued)

FOREIGN PATENT DOCUMENTS

WO        0014686 A1    3/2000

OTHER PUBLICATIONS

"About Element Positioning", Retrieved at << http://msdn.microsoft.com/en-us/library/ms533005(VS.85).aspx >>, MSDN Library, May 10, 2008, pp. 1-8.

(Continued)

*Primary Examiner* — Sherrod Keaton
(74) *Attorney, Agent, or Firm* — Kevin Sullivan; Kate Drakos; Micky Minhas

(57) ABSTRACT

A declarative animation system allows a designer to declaratively specify transitory behavior of a user interface or other visual display by recognizing changes in an underlying data model that spans visual elements. A visual display is typically comprised of one or more visual elements, as well as an underlying data model. Although animating within a particular visual element is typically straightforward, moving items across visual elements typically involves sophisticated programming logic. However, using the declarative animation system, visual elements can be associated with an underlying data model in a manner that allows the visual display layer to recognize and respond to changes in the underlying data model. This association can also be leveraged to allow automatically generated animation between visual elements without the addition of custom programmatic code. Thus, the declarative animation system allows designers to specify intuitive, graphically sophisticated interfaces without programming knowledge.

20 Claims, 4 Drawing Sheets

(56) References Cited

U.S. PATENT DOCUMENTS

2009/0319929 A1 12/2009 Wang et al.
2009/0327921 A1 12/2009 Holm-Peterson et al.

OTHER PUBLICATIONS

"aiSee: Graph Animation", Retrieved at << http://www.aisee.com/download/anim.htm >>, Apr. 20, 2002, pp. 1-2.

Tekusova, et al., "Vizualizing Time-Dependent Data in Multivariate Hierarchic Plots—Design and Evaluation of an Economic Application", Retrieved at << http://ieeexplore.ieee.org/stamp/stamp.jsp?arnumber=04577939 >>, Proceedings of the 2008 12th International Conference Information Visualisation, Jul. 9-11, 2008, pp. 143-150.

International Search Report, Mailed Date: Nov. 16, 2011, Application No. PCT/US2001/026355, Filed Date: Feb. 25, 2011, pp. 9.

* cited by examiner

SMOOTH LAYOUT ANIMATION OF VISUALS

BACKGROUND

Modern user interface toolkits use layout managers to create user interfaces that can be dynamically resized. Layout managers are software components that have the ability to lay out components (sometimes called widgets) by their relative positions without using distance units. It is often more natural to define component layouts in this manner than to define component positions in pixels or common distance units, so a number of popular widget toolkits include this ability by default. Widget toolkits often allow designers to place widgets in layout containers that have particular layout characteristics when the container is rendered. Windows Presentation Foundation (WPF) and Microsoft Silverlight are two examples of toolkits that provide layout managers. Designers describe user interface (UI) components in Extensible Application Markup Language (XAML) and can define UI states and transitions using an Application Programming Interface (API) such as MICROSOFT™ Silverlight or MICROSOFT™ WINDOWS™ Presentation Foundation.

One reason that layout managers are used is to enable automatic resizing of an application, so that UIs can work properly on devices with different display resolutions and with resizable, reconfigurable windows. Layout managers are also good at handling varying sizes/quantities of content. Layout managers are used to automatically determine the layout of graphical elements and controls on a screen. Layout managers typically operate by forcing their children (graphical elements, UI elements) to conform to a certain layout rule. A stack panel, for example, may force its children into a horizontal or vertical stack, controlling only relative position of the objects with respect to each other. As another example, a uniform grid might force objects to be arranged in a grid, with a fixed size for each child. A table-style layout might force children to conform to row and column definitions, and to define position margins to control positioning and size.

For dynamic user interfaces, it is often useful to transition between different layouts of UI components. For example, when a user clicks on a "More" button the designer may want the area of one component to expand and display more UI controls. For usability reasons, designers like transitions to be smooth and allow for detailed control. In some scenarios, it is sufficient to simply fade between two entirely different UI screens, but this technique does not work when a layout of graphical elements or user interface controls is designed to morph smoothly from one layout to another. For example, a designer may want a panel to appear to fly out from the left side after a user logs in to an application. Current animation systems, such as Microsoft Visual State Manager, automatically animate transitions from one state to another. In the previous example, the animation system causes the panel to animate from the left side of the display through several intermediate locations before reaching the final fully displayed location.

User interface animation increases the reality of interacting with objects experienced by users of the interface. For example, folders that animate from one location to another are easier to understand than those that simply disappear and reappear at another location. One type of user interface animation is a "bounce," which refers to the desirability of an object having some amount of elasticity as it moves from one location to another. For example, a software designer may want an object dragged from one location to another to bounce at the destination as it would if physically dropped. The bounce calls the user's attention to the object's new location and gives the object a more realistic feel, making the interface more pleasing to use.

Many modern applications and systems use motion to explain how information moves from one place to another. Examples include animating the motion of selected items from a master list to a filtered list, animating an application to grow out of its icon when launched, or animating deleted files to a recycle bin. Today, this work is typically done by writing custom code specific to the task. However, as the nature of the animation is highly visual, there is a great need to put the control of the animation in the hands of a visual designer who does not wish to, or even know how to, write code to perform the task.

SUMMARY

A declarative animation system is described herein that allows a designer to declaratively specify transitory behavior of a user interface or other visual display by recognizing changes in an underlying data model that spans visual elements. A visual display is typically comprised of one or more visual elements, as well as an underlying data model. Although animating within a particular visual element is typically straightforward, moving items across visual elements typically involves sophisticated programming logic, particularly when the visual elements are encapsulated in different controls. However, using the declarative animation system, visual elements can be associated with an underlying data model in a manner that allows the visual display layer to recognize and respond to changes in the underlying data model. This association can also be leveraged to allow automatically generated animation between visual elements without the addition of custom programmatic code. Thus, the declarative animation system allows designers to specify intuitive, graphically sophisticated interfaces without programming knowledge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
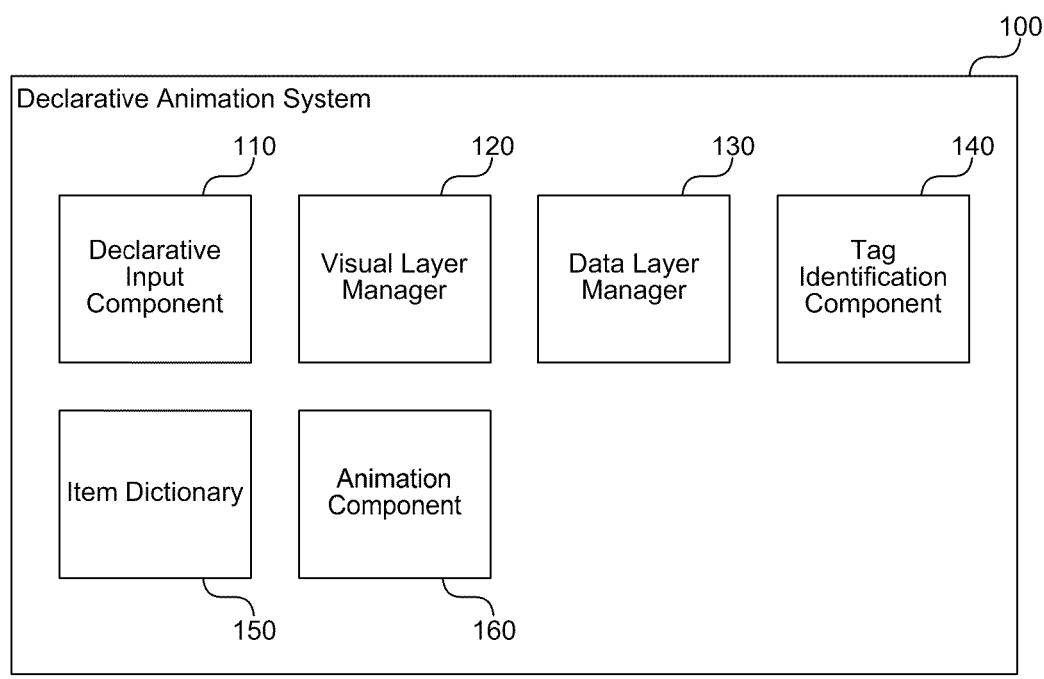
FIG. 1 is a block diagram that illustrates components of the declarative animation system, in one embodiment.

A declarative animation system is described herein that allows a designer to declaratively specify transitory behavior of a user interface or other visual display by recognizing changes in an underlying data model that spans visual elements. A visual display is typically comprised of one or more visual elements, as well as an underlying data model. For example, an e-commerce web page might include one visual element that presents a list of items on the left from which a user can select, and another visual element that presents a detail view of a selected item on the right. Underlying the visual display in this example is a data model that includes a list of items for sale and information about the items, such as an image of the item, descriptive information, a price, and so forth. There is also an overall shopping session data model that contains the items being viewed, the contents of a shopping cart, and so on. Although animating within a particular visual element is common (e.g., sorting a list of items to reorder the items or increasing the size of an element when a cursor hovers over it), moving items across visual elements typically involves sophisticated programming logic, particularly when the visual elements are encapsulated in different controls. For example, although it is intuitively straightforward that a selected item in the list on the left in the above example is related to the item in the detail view on the right, there is no way for the visual display to understand this relationship without code connecting the two. However, using the declarative animation system, visual elements can be associated with an underlying data model in a manner that allows the visual display layer to recognize and respond to changes in the underlying data model. This association can also be leveraged to allow automatically generated animation between visual elements without the addition of custom programmatic code. Thus, the declarative animation system allows designers to specify intuitive, graphically sophisticated interfaces without programming knowledge.

In some embodiments, the system maintains a dictionary of items in which the dictionary key corresponds to the underlying data model of a visual element, and the dictionary value is the last known position of that element. Whenever the association between the underlying data model and visual elements changes, the declarative animation system can produce an animation from the last known position in one visual element to a new position in another visual element. Returning to the e-commerce example above, the data models for individual items may not change, but the data model of the user's shopping session has changed, and the change in the overall shopping session model might change which item's data model is applied to particular visual elements. In this way, there can be a declarative relationship between elements at the visual level or at the data level, and this declarative relationship can be used to control animations at the layout level without custom code.

FIG. 1 is a block diagram that illustrates components of the declarative animation system, in one embodiment. The system 100 includes a declarative input component 110, a visual layer manager 120, a data layer manager 130, a tag identification component 140, an item dictionary 150, and an animation component 160. Each of these components is described in further detail herein.

The declarative input component 110 parses a declarative representation of a user interface including one or more visual elements. For example, the system 100 may load an extensible markup language (XML) file that defines one or more visual elements to be displayed on a web page or other user interface page. The declarative representation may include information such as hierarchical relationships between visual elements, whether visual elements participate in layout animation, whether a visual element is identified by a data element with which it is associated, and so forth. A declarative representation can be created by a designer having no programming experience using a user interface for editing declarative representations (e.g., a visual tool, such as MICROSOFT™ Expression Blend). To the extent that any behavior can be defined within this declarative representation, it is within the skill set of the designer without programming knowledge.

The visual layer manager 120 manages a displayed representation of the declarative representation. The visual layer may include graphical controls that map to particular visual element tags specified in a declarative representation (e.g., a canvas, stack panel, and so forth). The visual layer manager 120 manages displaying each visual element as well as informing elements that an update is needed when a parent visual element changes. The visual layer manager 120 understands the visual elements displayed but does not necessarily understand the context of the items. For example, a list view may display a list of items and a detail view may display a detailed description of a selected item, but the visual layer may not know that the selected item in the list view and the item described in the detail view are related to the same data.

The data layer manager 130 manages one or more data items associated with the displayed representation. The data layer manager 130 may retrieve a list of data items from another source. For example, an online bookstore may store data items related to each book that the bookstore sells in a database, and the data layer manager 130 may access the database based on a user interface request to display particular items (e.g., in response to a search query). The data layer manager 130 may also maintain properties of each data item, such as an image associated with a data item, a caption related to the data item, descriptive text related to the data item, and so forth.

The tag identification component 140 identifies a tag for each displayed visual element. In some cases, the declarative representation for a visual element specifies a tag for the visual element and the tag identification component 140 simply reads and loads the specified tag into the item dictionary 150. In other cases, the tag identification component 140 automatically generates a tag for a visual element based on a data item related to the visual element. For example, if the system 100 is displaying purchasable items from an e-commerce website, then the data item may include an item for sale, and the visual elements may include user interface controls related to displaying the item for sale. A tag for an item can be declared or generated in a way that the tag stays the same for a particular data item, even as that item changes relationship with various visual elements. For example, a data item may initially be displayed in a first list view and later displayed in a second list view, but may have the same tag in both cases. This forms a basis for tracking the data item even as it moves across visual elements.

The item dictionary 150 is a table that maps identified tags to visual elements and stores position information about each visual element. For example, the table may include a tag column, a layout position column, and a parent column. The parent column defines the parent of the visual element. The layout position column specifies a last known position of a visual element, which may be in coordinates relative to that element's parent. When user interaction or other input causes a layout change, the system 100 performs a layout pass that update the visual display. During the layout pass, the system identifies items by tag that have changed position (and potentially even changed parent). For example, if a data item initially associated with and displayed by a visual element in one list is moved to a second list so that the data item is associated with and displayed by a new visual element, then the system correlates the two visual elements by tag, and animates the movement of the data item from the first visual element to the second visual element using new position information about the second visual element and last known position information about the first visual element stored in the item dictionary 150. This allows animation of data item movement across visual elements through a declarative representation and generalized layout pass.

The animation component 160 provides animation as a data items move in a visual display. For example, a data item may move within a visual element (e.g., sorting a list) or may switch visual elements (e.g., removal from one list and insertion in another) throughout the lifetime of a displayed user interface. The animation component uses changes in position and parent information from the information stored by the item dictionary 150 to detect movement at the data layer and animate the visual layer to reflect a data item's new representation. The animation component 160 may provide any number of well-known animation techniques, such as fade in, fade out, using a timer to show an item at intermediate positions between two points over time, and so forth.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
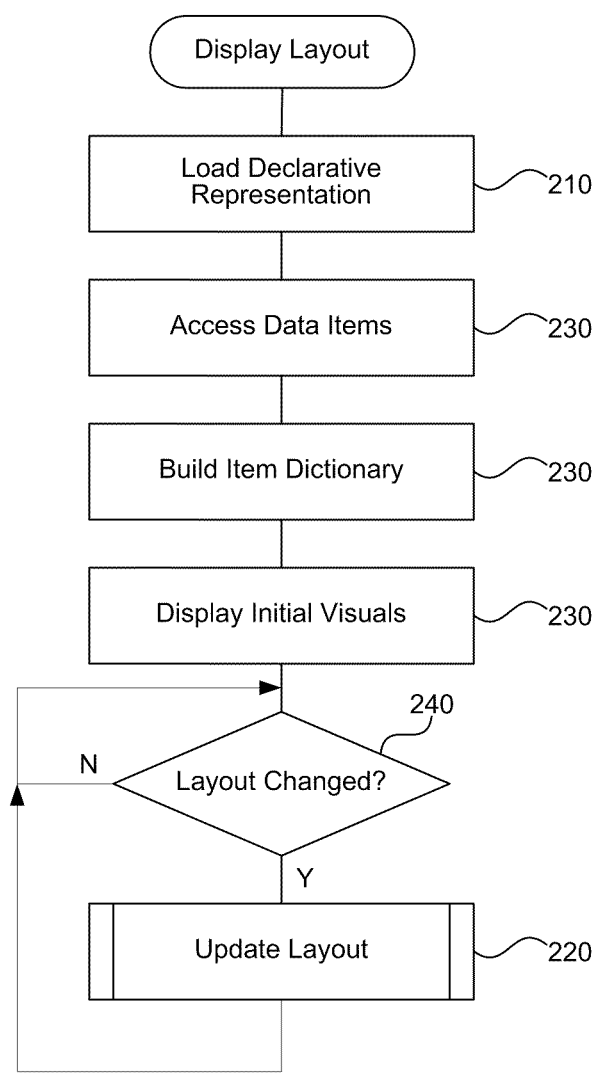
FIG. 2 is a flow diagram that illustrates processing of the declarative animation system to load and display a visual layout, in one embodiment.

FIG. 2 is a flow diagram that illustrates processing of the declarative animation system to load and display a visual layout, in one embodiment. Beginning in block 210, the system loads a declarative representation of a user interface and data model from persistent storage. For example, the declarative representation may include an XML or other representation stored in a file or other data store. The declarative representation describes visual elements of the user interface, properties of each visual element, behavior of the visual element, how the visual element is linked to the data model, and so forth. Continuing in block 220, the system accesses one or more data items referenced by the declarative representation. For example, the system may load images, text, video, and other multimedia related to a data item from a database, cloud-based storage service, file system, or other data store. The loaded information is displayed in visual elements.

Continuing in block 230, the system builds a dictionary that tracks one or more visual elements of the user interface defined in the declarative representation and one or more positions of the visual elements. For example, the dictionary may include a table keyed by tags associated with each data item and assigned to visual elements associated with each data item. For example, a chair in a product catalog may have a tag that is an object representing a data model of the chair that the system also assigns to visual elements that represent the chair. Continuing in block 240, the system displays the visual elements tracked by the dictionary in one or more initial positions. The user interface may include controls for modifying the displayed layout, such as check boxes that the user can check and uncheck, buttons that modify the displayed layout when activated, and so forth.

Continuing in decision block 250, the system determines whether one or more displayed visual elements have changed. If the layout has changed, then the system continues at block 260, else the system loops to block 250 to continue waiting for changes. Continuing in block 260, the system updates the displayed visual elements as described further with reference to FIG. 3. During the update, the system compares any new position of a visual element based on a tag associated with the visual element with any visual element in the dictionary that was similarly tagged to detect movement. If a movement is detected, then the system provides an animated transition from the old position to the new position of the tagged item, even if the visual element representing the item has changed. After block 260, these steps conclude.

Figure 3:
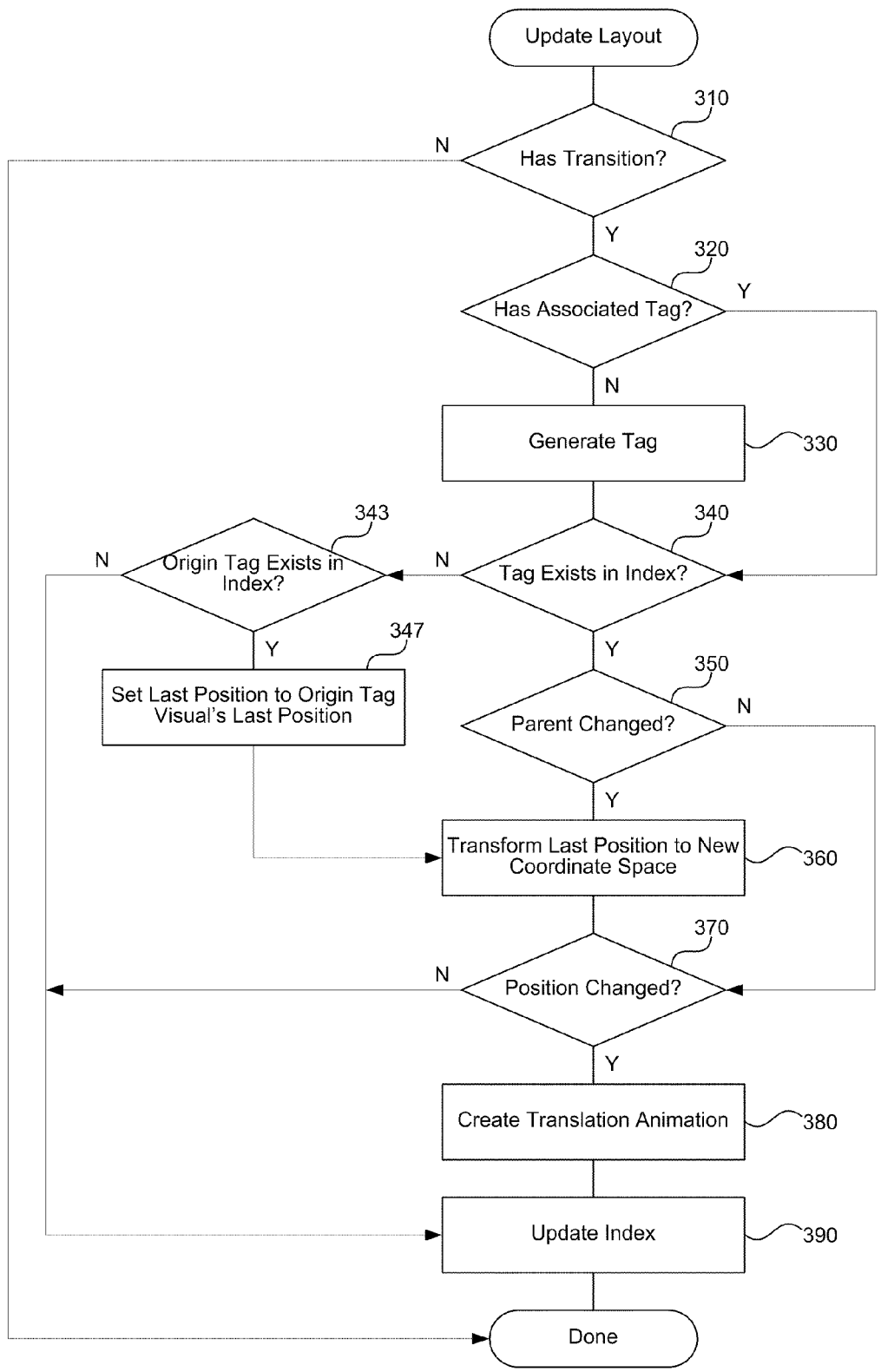
FIG. 3 is a flow diagram that illustrates processing of the animation component to animate changes to a user interface, in one embodiment.

FIG. 3 is a flow diagram that illustrates processing of the animation component to animate changes to a user interface, in one embodiment. Beginning in block 310, the component determines whether a data item represented by a particular visual element that has a defined transition in a declarative representation of the user interface has changed. For example, the declarative representation may specify that a list item has an associated half-second transition. The transition specifies how the user interface designer wants the component to animate movement of a data item or visual element from one location to another.

Continuing in decision block 320, the component determines whether the visual element has an associated tag in the declarative representation. For example, a user interface designer may label each visual element with an explicit tag. If the visual element does not have a tag, then the component continues in block 330, else the component jumps to block 340. Continuing in block 330, the component generates a tag for the visual element. For example, the component may use the visual element as its own tag. In some embodiments, the declarative representation may specify that a particular visual element is tagged based on an associated data model. For example, a list may specify that the items in the list provide a tag for each visual element related to an item.

Continuing in decision block 340, the component determines whether the tag associated with the visual element is present in an index of visual elements and position information. If the tag is present in the index, then the component continues at block 350, else the component jumps to block 343. If execution continues to decision block 343, the component determines whether an origin tag exists in the index. For example, an origin tag may include an application icon or other well-defined location from which the system will perform an animation transition. If the origin tag is found then the component continues at block 347, else the component jumps to block 390. Continuing in block 347, the component treats the identified origin tag's last position as the last position of the current visual for generating a transition animation. The system may also animate a visual element from its last location to a termination tag (not shown) in a similar manner (e.g., moving an object to a recycle bin).

Alternatively, if execution continues to decision block 350, the component determines whether the visual element has a current parent that differs from a stored parent of a visual element in the index with a matching tag. If the visual element has a different parent, then the component continues at block 360, else the component jumps to block 370. For example, if a user requests to move a visually represented data item from one list to another, then the data item will be represented by an old visual element in the source list, and a new visual element in the target list, but both will have the same tag so that the old visual element (and its last position) can be identified in the index. Continuing in block 360, the component transforms a position of the visual element in the index to a coordinate space of the current parent. This step is optional and is used when position coordinates stored in the index are relative to the parent of each visual element.

Continuing in decision block 370, the component determines whether the data item's position has changed between a last position of the visual element in the index and a position of the visual element currently representing the data item. If the position has changed, then the component continues at block 380, else the component continues at block 390. Continuing in block 380, the component creates a translation animation to smoothly move the data item from the last position of the visual element in the index to the position of the visual element currently representing the data item. For example, the old position may specify the location of a visual element in a first list from which the data item was removed and the new position may specify the location of a visual element in a second list to which the data item was added. Continuing in block 390, the component updates the index to associate the current parent and the current position with the visual element currently representing the data item. For example, the component may use the common tag to update the entry associated with the tag with the new parent and position values. After block 390, these steps conclude.

Figure 4:
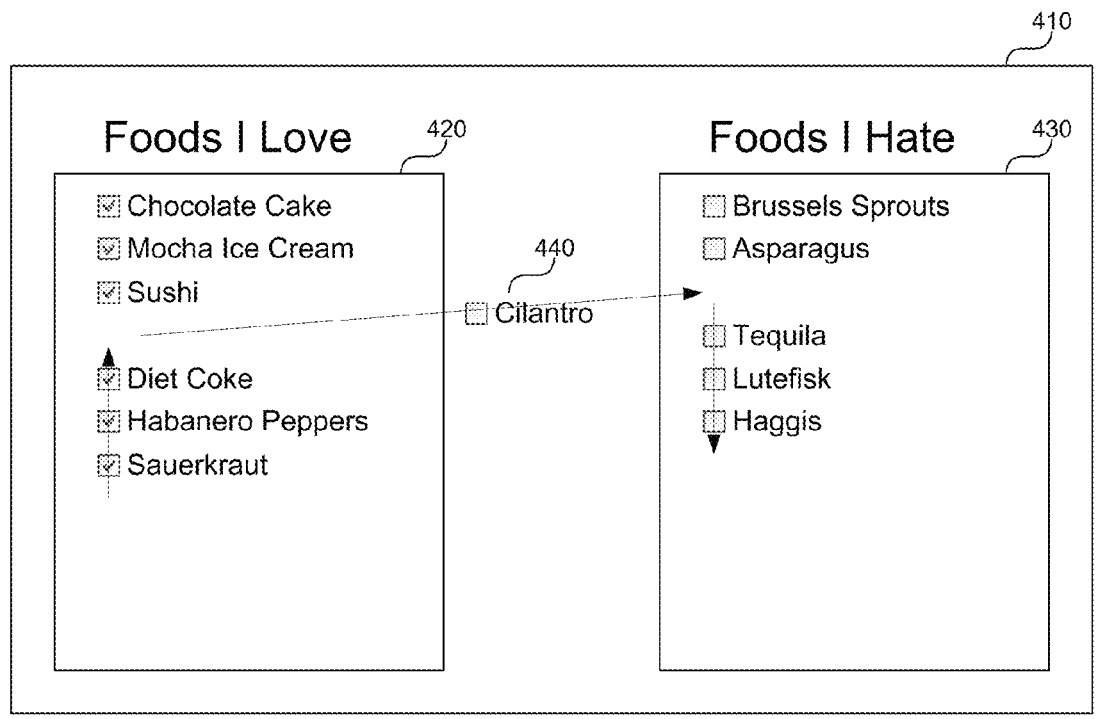
FIG. 4 is a display diagram that illustrates a user interface update animation using the declarative animation system, in one embodiment.

FIG. 4 is a display diagram that illustrates a user interface update animation using the declarative animation system, in one embodiment. The diagram includes a display 410 with a left list 420 and a right list 430. Each list contains a list of items. Based on whether a user likes each of the items, the user wants to place the items in either the left list 420 or the right list 430. From a programming point of view, there is a visual layer that includes two list controls (or panels) that are independent. The left list 420 is not aware of the right list 430, but they likely share the same parent. When a user moves an item 440 from the left list 420 to the right list 430, behind the scenes the item 440 is removed from the left list 420, the remaining items of the left list 420 adjust upwards, the right list 430 adjusts items downwards to make room for the new item, and the item 440 is added to the right list 430. In the past, this type of movement involves custom programmatic code that implements the semantic meaning of the two lists. However, there is also a data layer that is shared by both lists, and includes a list of items and perhaps a column that indicates whether the user likes or dislikes each item. By using changes at the data layer to drive changes to the visuals, the system can automatically update the two lists and even animate the movement of item 440 from the left list 420 to the right list 430, without any new programmatic code. A typical layout system with a visual manager builds a table of visuals and positions that allows animation of a visual as it changes layout position (e.g., within only the left list or the right list). The table may contain data as follows.

| Visual  | Layout Position |
|---------|-----------------|
| visual1 | 0,0-200,200     |
| visual2 | 50,50-100,150   |

The table is built from all visuals that have been declaratively marked as participating in layout animation. A visual can mark itself as participating, or it can alternatively mark all of its children as participating. When registering to participate, the duration and timing curve can also be specified. After a layout pass (which updates the positions of all visuals), the system scans the positions of all visuals in the table, and if any positions have changed, the system starts an animation from the old position to the new position. The animation can also be built directly into the layout pass. The animations run in a transformation layer that sits above layout, so the animation itself does not affect the table. An example of declarative markup for two visuals participating in layout animation follows.

```
<Rectangle x:Name="visual1">
  <Rectangle.LayoutTransition>
    <LayoutTransition Duration="00:00:00.5"/>
  </Rectangle.LayoutTransition>
</Rectangle>
<Canvas x:Name="canvas">
  <Canvas.LayoutTransition>
    <LayoutTransition Duration="00:00:00.5" Scope="Children"/>
  </Canvas.LayoutTransition>
  <Rectangle x:Name="visual2"/>
</Canvas>
```

The declarative animation system goes a step further and animates a visual as it changes layout position and tree position (e.g., moving from the left list to the right list). The positions stored in the table are parent-relative, because if the parent changes position for any reason, it will automatically bring all of its children with it. The table is expanded as follows:

| Visual  | Layout Position | Tree Parent |
|---------|-----------------|-------------|
| visual1 | 0,0-200,200     | visualRoot  |
| visual2 | 50,50-100,150   | canvas      |

If, after a layout pass, the visual is determined to have a new tree parent, then the previous layout position is transformed from the coordinate space of the old parent into the coordinate space of the new parent. The transformed position is used to build the animation. In some embodiments, to simplify this process the system adds a "root-relative layout position" column to the table. The declarative markup for this stage is unchanged from that shown above.

In some embodiments, the declarative animation system goes still further and replaces a visual identifier with a layout tag. Here, the system modifies the left-hand column of the table so that it can hold visuals or more abstract "tags." Now, when scanning participating visuals after a layout pass, the system looks for a tag on the element, and if no tag is present, the element will serve as its own tag. Moreover, in a data-generated list, the system will automatically generate a tag whose value is the data item used to generate that visual.

| Layout Tag | Layout Position | Tree Parent |
|---|---|---|
| visual1 | 0,0-200,200 | visualRoot |
| visual2 | 50,50-100,150 | visual1 |
| "Haggis" | 0,100-120,120 | foodsIDislike |
| "Cilantro" | 0,80-120,100 | foodsILike |

For example, if in the application's data model, "Cilantro" changes status from "Like" to "Dislike," the visuals pertaining to "Cilantro" in the "Like" list are deleted and a completely new set of visuals are spawned in the "Dislike" list. With the changes to the leftmost column, this table contains sufficient information to produce an effective animation to the new position; the new visual representation for "Cilantro" will appear to come from the last-recorded position of the older visual representation. In some embodiments, the system adds a "last associated visual" column to the table as well, to manage element lifetime issues. The system can also animate a representation of the object in a layer above the other visuals; this is useful for animating outside the clipping region of a ListBox, for example. The declarative markup has two new properties added to it (TagType, which can be set to Element or DataContext, and FloatAbove), which may look like this:

```
<StackPanel x:Name="foodListPanel">
<StackPanel.LayoutTransition>
<LayoutTransition Duration="00:00:01" Scope="Children"
TagType="DataContext" FloatAbove="False"/>
</StackPanel.LayoutTransition>
</StackPanel>
```

In some embodiments, the system animates a visual from a tagged origin point or towards a tagged termination point. With the described table of information, it is possible to effectively animate the entrance and disappearance locations of visuals as well. The system adds properties to a visual signifying "Tag I appear from" and "Tag I disappear to." Then, when creating a visual, the system can look in the table to find the place a visual is supposed to come from (example: an application should come from its icon). Similarly, when destroying a visual, the system can look in the table to find out where the visual is supposed to go (example: a file should go to the Recycle Bin). Following is simplified markup illustrating an additional "TerminationLocation" property.

```
<Desktop>
<Desktop.LayoutTransition>
<LayoutTransition Duration="00:00:01" Scope="Children"
TerminationLocation="{RecycleBin}"/>
</Desktop.LayoutTransition>
<Icon LayoutTag="{RecycleBin}"/>
</Desktop>
```

In some embodiments, the declarative animation system is implemented in an application-programming interface (API) that developers can invoke to provide animations for their software applications. For example, implementations of the animation system may be provided in the Silverlight 3.0 and Windows Presentation Foundation 4.0 APIs. The declarative animation system can also be integrated into a single software application or packaged differently in other APIs or graphics libraries as appropriate for a particular application.

In some embodiments, the declarative animation system operates on some visual elements that use layout management alongside other visual elements that do not use layout management. For example, a user interface may include elements positioned according to absolute coordinates alongside visual elements positioned relative to other visual elements. The system may animate changes to the relative positioned elements without affecting the absolute positioned elements. The system may also allow a designer to toggle the animation described herein on or off for a particular group of visual elements, so that groups with the system on use the techniques described herein, and groups with the system toggled off use traditional layout animation techniques.

In some embodiments, the declarative animation system also handles transitions that are interrupted. A user interface layout may change to one state when a user toggles a button and another state when the user toggles the button again. If the user quickly toggles the button back and forth, then the layout may be mid-transition when the user's action reverses the transition. This system handles this smoothly by animating the layout according to the new final state by starting from the mid-transition position. To do this, the system may store intermediate positions in the item dictionary/index.

In some embodiments, the declarative animation system receives a property from the declarative representation for a visual element that causes transitions of the visual element to float above other elements. Because the system provides animation of data elements that move from one visual element to another visual element, the system may interfere with traditional user interface notions of item parents receiving notification when their children change, and so forth. Thus, the system may allow the designer to specify that when the system animates a particular visual element transition, the animation floats above other controls or visual elements of the user interface. The system may take a bitmap snapshot of the interface or elements within the interface and then superimpose the animated transition over other elements to reach the final position/state of the user interface after the transition.

From the foregoing, it will be appreciated that specific embodiments of the declarative animation system have been described herein for purposes of illustration, but that various modifications may be made without deviating from the spirit and scope of the invention. For example, although user interfaces are described herein as examples, the system can also be used with other visual displays not necessarily intended for user input or interaction. For example, the visual layout may change according to non-user input, such as movement of a device detected by a GPS chip in the device, and so forth. Accordingly, the invention is not limited except as by the appended claims.

I claim:

1. A computer-implemented method for updating a visual layout of a declaratively defined user interface, the method comprising:

determining whether an association between a data item and a particular visual element that has a defined transition in a declarative representation of the user interface has changed;

determining whether the visual element has an associated tag in the declarative representation;

determining whether a tag associated with the visual element is present in an index of visual elements, wherein the index contains position information for one or more visual elements, the position information including a tag column, a layout position column, and a parent element column wherein the layout position column specifies a last know position of the visual element relative to coordinates of a stored parent in the parent element column of each visual element;

determining whether the visual element has a current parent that differs from the stored parent of a visual element in the index with a matching tag;

determining whether a position of the data item has changed between a last position of the visual element in the index and a position of the visual element currently representing the data item; and upon determining that the position of the data item has changed and the current parent for the visual element differs from the stored parent, creating a translation animation to smoothly move the data item from the last position of the visual element in the index to the position of the visual element currently representing the data item, wherein the transition animation is created automatically without receiving custom software code, thereby allowing a designer having no programming experience to declaratively specify transition animations; and updating the index to associate the current parent and the current position with the visual element currently representing the data item, wherein the preceding steps are performed by at least one processor.

2. The method of claim 1 wherein determining whether the association between the data item and the visual element has changed comprises receiving input from a user that modifies a model that includes the data item.

3. The method of claim 1 wherein determining whether the association between the data item and the visual element has changed comprises accessing the declarative representation of the user interface and identifying a defined transition for the data item.

4. The method of claim 1 further comprising, upon determining that the visual element does not have an associated tag, automatically generating a tag for the visual element.

5. The method of claim 1 wherein determining whether the visual element has an associated tag comprises detecting that the visual element specifies a data-based tag in the declarative representation and generating a tag for the visual element based on a data item that the element represents.

6. The method of claim 1 wherein determining whether the visual element has a current parent that differs from a stored parent comprises identifying a visual element with a specified tag in the index, reading the stored parent of the identified visual element from the index, and comparing the parent visual element to the current parent.

7. The method of claim 1 further comprising, upon determining that the current parent has changed, transforming a position of the visual element in the index to a coordinate space of the current parent.

8. The method of claim 1 wherein creating the translation animation to smoothly move the data item comprises moving the item visually from a location of a first visual element to a location of a second visual element, wherein the first and second visual elements are separately defined in the declarative representation.

9. The method of claim 1 wherein updating the index comprises identifying a common tag to update the entry associated with the tag with the new parent and position values.

10. A computer system for providing automatic visual transitions for a declaratively defined user interface, the system comprising:

a processor and memory configured to execute software instructions;

a declarative input component configured to parse a declarative representation of a user interface including one or more visual elements;

a visual layer manager configured to manage a displayed representation of the declarative representation, wherein the displayed representation includes one or more graphical controls that map to particular visual elements specified in the declarative representation;

a data layer manager configured to manage one or more data items associated with the displayed representation;

a tag identification component configured to identify a tag for at least one displayed visual element that relates the visual element to at least one data item;

an item dictionary configured to store a table that maps identified tags to visual elements and stores position information about each visual element and is further configured to include a tag column, a layout position column, and a parent element column, wherein the layout position column specifies a last known position of a visual element relative to coordinates of a stored parent in the parent element column; and an animation component configured to provide animation as data items move in a visual display based on a position change of a tagged item in the item dictionary and an identified change between the stored parent and a determined current parent of the visual element, wherein the stored parent is a different parent from the determined current parent, and wherein each transition animation is created automatically without receiving custom software code, thereby allowing a designer having no programming experience to declaratively specify transition animations.

11. The system of claim 10 wherein the declarative input component is further configured to load an extensible markup language (XML) file that defines one or more visual elements to be displayed on a user interface page.

12. The system of claim 10 wherein the declarative input component is further configured to identify a declaration specifying that the system should assign a tag to a visual element based on a data item associated with the visual element at run time.

13. The system of claim 10 wherein the declarative input component allows a designer to specify a user interface with animated transitions between visual elements without adding programmatic code.

14. The system of claim 10 wherein the visual layer manager is further configured to manage displaying each visual element and inform elements that an update is needed after a visual element changes.

15. The system of claim 10 wherein the animation component is further configured to provide a transition animation from a location of a visual element to a termination location or from an origin location to the location of the visual element, wherein the origin and termination locations can be defined by a separate data model associated with a visual element.

16. The system of claim 10 wherein the tag identification component is further configured to access the declarative representation for a visual element and identify a tag for the visual element stored in the declarative representation.

17. The system of claim 10 wherein the tag identification component is further configured to automatically generate a tag for a visual element based on a data item related to the visual element, such that the tag stays the same for the data item, even as that item changes relationship with various visual elements.

18. A computer implemented method, comprising:

loading a declarative representation of a user interface and a data model from persistent storage;

accessing one or more data items referenced by the declarative representation of the user interface;

building a dictionary that tracks one or more visual elements of the user interface defined in the declarative representation and one or more positions of the visual elements;

displaying the visual elements tracked by the dictionary in one or more initial positions, wherein the user interface includes controls for modifying the displayed layout based on user input;

determining whether one or more displayed visual elements have changed, by determining that a current parent of the visual element is different from a stored parent of the visual element wherein the current parent is a different parent than the stored parent; and upon determining that one or more displayed visual elements have changed, updating the displayed visual elements by comparing a new position of a visual element based on a tag associated with the visual element, wherein the tag includes coordinate position of the visual element relative to the current parent of the visual element, with any visual element in the dictionary that was similarly tagged to detect movement and providing an animated transition from the old position to the new position of the tagged item, wherein the old position is a coordinate position relative to the stored parent of the visual element, even if the visual element representing the item has changed, wherein the animated transition is created automatically without receiving custom software code, thereby allowing a designer having no programming experience to declaratively specify transition animations; and wherein the preceding steps are performed by at least one processor.

19. The method of claim 18 wherein the dictionary includes a table keyed by tags associated with each data item and assigned to visual elements associated with each data item.

20. The method of claim 1 wherein updating the index comprises changing the stored parent in the index to the current parent when the current parent is determined to be a different parent than the stored parent.

* * * * *